(12) United States Patent
Colussi et al.

(10) Patent No.: US 11,654,732 B2
(45) Date of Patent: *May 23, 2023

(54) TIRE PRESSURE INDICATING DEVICE

(71) Applicant: COL-VEN S.A., Santa Fe (AR)

(72) Inventors: Primo Antonio Colussi, Santa Fe (AR);
Natalio Domingo Venica, Santa Fe (AR)

(73) Assignee: COL-VEN S.A., Santa Fe (AR)

( * ) Notice: Subject to any disclaimer, the term of this patent is extended or adjusted under 35 U.S.C. 154(b) by 7 days.

This patent is subject to a terminal disclaimer.

(21) Appl. No.: 17/130,635

(22) Filed: Dec. 22, 2020

(65) Prior Publication Data

US 2021/0107322 A1    Apr. 15, 2021

Related U.S. Application Data

(63) Continuation-in-part of application No. 16/023,285, filed on Jun. 29, 2018, now Pat. No. 11,052,712.

(51) Int. Cl.
*B60C 29/00*    (2006.01)
*B60C 23/04*    (2006.01)
*G01L 17/00*    (2006.01)
*B60C 23/00*    (2006.01)

(52) U.S. Cl.
CPC ...... *B60C 29/005* (2013.01); *B60C 23/00318* (2020.05); *B60C 23/00354* (2020.05); *B60C 23/00363* (2020.05); *B60C 23/0496* (2013.01); *G01L 17/00* (2013.01); *B60C 23/0405* (2013.01)

(58) Field of Classification Search
CPC .............. B60C 23/003; B60C 23/0405; B60C 23/0496; B60C 29/005
See application file for complete search history.

(56) References Cited

U.S. PATENT DOCUMENTS

| | | |
|---|---|---|
| 1,478,506 A | 12/1923 | Bromberg |
| 1,497,441 A | 6/1924 | Henemier et al. |
| 1,803,270 A | 4/1931 | Morrison |
| 1,894,372 A * | 1/1933 | Fleck .................. B60C 23/0496 137/227 |
| 2,476,706 A | 7/1949 | Crowley |
| 3,866,563 A | 2/1975 | Bluem |
| 4,244,214 A | 1/1981 | Curran |

(Continued)

*Primary Examiner* — Jill E Culler
(74) *Attorney, Agent, or Firm* — Howard M. Gitten, Esq.; Lewis Brisbois Bisgaard & Smith LLP

(57) ABSTRACT

An inflation viewing device has a main body which is externally provided with a transparent viewing portion and internally provided with an inner passage where an air path assembly is arranged. An air entrance connector is operatively connected to an external air source and to a first end of the main body. An air exit connector is connected to a second, opposed end of the main body and to an inflation valve. A guide spacer is provided between the air entrance connector and the main body. The guide spacer has an inner passage having a wider section in communication with the inner passage of the main body and a reduced section defining a communication opening with the air entrance connector. A filter is arranged in the communication opening. A plunger, biased by a spring, is slidably arranged within the inner passage of the guide spacer and guide section of the main body inner passage.

4 Claims, 3 Drawing Sheets

(56) References Cited

U.S. PATENT DOCUMENTS

| | | | |
|---|---|---|---|
| 4,686,855 A * | 8/1987 | Smith | B60C 23/0496 |
| | | | 340/447 |
| 4,901,747 A | 2/1990 | Yabor | |
| 6,561,212 B1 | 5/2003 | Hsu | |
| 11,052,712 B2 * | 7/2021 | Colussi | B60C 23/0498 |
| 2005/0072349 A1 | 4/2005 | Perlin et al. | |

* cited by examiner

TIRE PRESSURE INDICATING DEVICE

CROSS REFERENCE TO RELATED APPLICATIONS

This application claims the benefit of U.S. application Ser. No. 16/023,285 filed Jun. 29, 2018, which claims the benefit of Argentine Application No. 20180100805 filed Apr. 3, 2018, the contents of each of which are herein incorporated.

STATE OF THE ART OF THE INVENTION

Field of the Invention

This invention relates to the field of devices, apparatus, and arrangements employed for inflating tires and, more particularly, it relates to a device that makes it possible to view the proper operation of inflation arrangements when at least one of the tires is losing air, while, in turn, it also enables a user to determine which tires are damaged. Even when in this description reference is made to a viewing device used in self-inflating arrangements, it should be clear that the device of this invention may be considered, adapted and used for any form of tire inflation or the like without any inconvenience.

Description of the Prior Art

Self-inflating arrangements of vehicle wheels, especially heavy transport vehicles, such as trailers, trucks, buses and the like, are well known in the field of the art and it is known that they allow for the automatic tire inflation upon an eventual air loss or leak during the journey. These arrangements usually use the compressed air in the vehicle air system in order to inflate a tire that has a leak or low pressure during the journey. The self-inflating arrangements connect to all of the vehicle tires and are controlled to supply air and maintain the tires at the desired pressure, even when the vehicle is in motion. When the air pressure drops below the level recommended by the tire manufacturer, the inflating arrangement automatically activates the air paths through a control box and uses the gap between the vehicle shafts to transfer the air flow with which the tires are inflated at a low pressure.

To such effect, a supporting set is generally mounted on the vehicle halfshaft, wherein said support comprises a plurality of fixing elements to the halfshaft cover and a housing wherein an outer rotor is coupled thereto, said outer rotor is provided with a plurality of valves that are connected to the wheel valves by means of respective conduits. Both the outer rotor and the support rotate together with the rotatory motion of the wheel. Likewise, the outer rotor comprises an adaptation mechanism which is static with regard to the wheel rotation and the supporting and rotor set and is operatively connected to a hose or conduit extended into the vehicle shaft and by means of which the air from the compressed air outer tank of the vehicle circulates to perform the automatic inflation of the tires in the event of a puncture or air leak.

US Published Patent Application No. 2019/0299726, to the same patentee of the present application, discloses an inflation viewing device comprising at least a main body which is externally provided with at least one translucent viewing portion and internally provided with an inner passage wherein at least a one-way air path assembly is arranged, at least one air entrance connector being operatively connected to an external air source and to a first end of said main body. At least an air exit connector is connected to a second, opposed end of the main body and to at least one inflation valve. A guide spacer is provided between said air entrance connector and the main body. The guide spacer has an inner passage which has a wider section, the wider section being in communication with the inner passage of the main body and a reduced section that defines a communication opening with the air entrance connector. At least one filter is arranged in the communication opening. At least one slidably guided plunger is slidably arranged within the inner passage of the guide spacer and a guide section of the inner passage of the main body. At least one spring is held between the plunger and the seat of the main body. A first end and a second end of the plunger has respective expansible fingers which are separated between each other, defining air circulation channels or pathways.

The inflation viewing device of US 2019/0299726 has proved to work properly; however, it has been found that when a vehicle, such as a truck provided with the device of the above-mentioned US application, needs to stop by tire shops that lack specialized staff, particularly tire shops that are further away from urban centers, in order to have the tire inflation valves checked, it has happened that operators try to insert a pressure gauge through the conduit wherein the inflation viewing device is connected without previously removing the inflation viewing device. It has caused some breaks in some inner parts of the inflation viewing device.

In view of the problem posed hereinabove, it is desired to have a new arrangement of the components of the inflation viewing device of Application US 2019/0299726 that prevents the inner components of the inflation viewing device from breaking upon an improper attempt to introduce any instrument or tool, for example to measure the internal pressure of the tire.

BRIEF DESCRIPTION OF THE INVENTION

It is an object of this invention to provide a new device that enables one to view the proper operation of self-inflating arrangements.

It is still a further object of the invention to provide a viewing device that enables one to determine which of all of the tires is being inflated.

It is still a further object of the invention to provide a viewing device wherein through a viewing area and a one-way air path set it makes it possible to determine the proper air circulation to perform the tire inflation.

It is a further object of the present invention to provide an inflation viewing device that may be adapted and used in any inflating arrangement.

It is a further object of the present invention to provide an inflation viewing device comprising at least a main body that is externally provided with at least a translucent viewing portion and internally provided with at least a one-way air path set, at least an air entrance connector operatively connected to an external air source and to one of the ends of said main body, and at least an air exit connector that is connected to the other main body end and to at least one inflation valve.

It is still a further object of the present invention to provide a viewing device that prevents an instrument or tool from being introduced into said device in order to avoid any damage that said instrument might cause in the inner components of the device.

It is a further object of this invention to provide an inflation viewing device having at least a main body which is externally provided with al least one transparent viewing portion and internally provided with at an inner passage wherein at least one-way air path assembly is arranged. At least one air entrance connector is operatively connected to an external air source and to a first end of said main body. At least an air exit connector is connected to a second, opposed end of the main body and to at least one inflation valve. A guide spacer is provided between the air entrance connector and the main body. The guide spacer has an inner passage which has a wider section that is in communication with the inner passage of the main body and a reduced section that defines a communication opening with the air entrance connector. At least one filter is arranged in the communication opening. At least one slidably guided plunger is slidably arranged within the inner passage of the guide spacer and guide section of the inner passage of the main body. At least one spring is held between the plunger and the seat of the main body. Axially extending fingers are formed at a first end of the plunger, which fingers are separated from each other, defining air circulation channels or pathways. A protecting piece mounted against an inner step of the air entrance connector whereby the filter is retained between the protecting piece and the guide spacer.

BRIEF DESCRIPTION OF THE DRAWINGS

For the purpose of providing more clarity and a better understanding of the subject-matter of the invention, it has been illustrated in several figures, in which the invention has been represented by way of example in a preferred embodiment wherein.

DETAILED DESCRIPTION OF THE INVENTION

Figure 1:
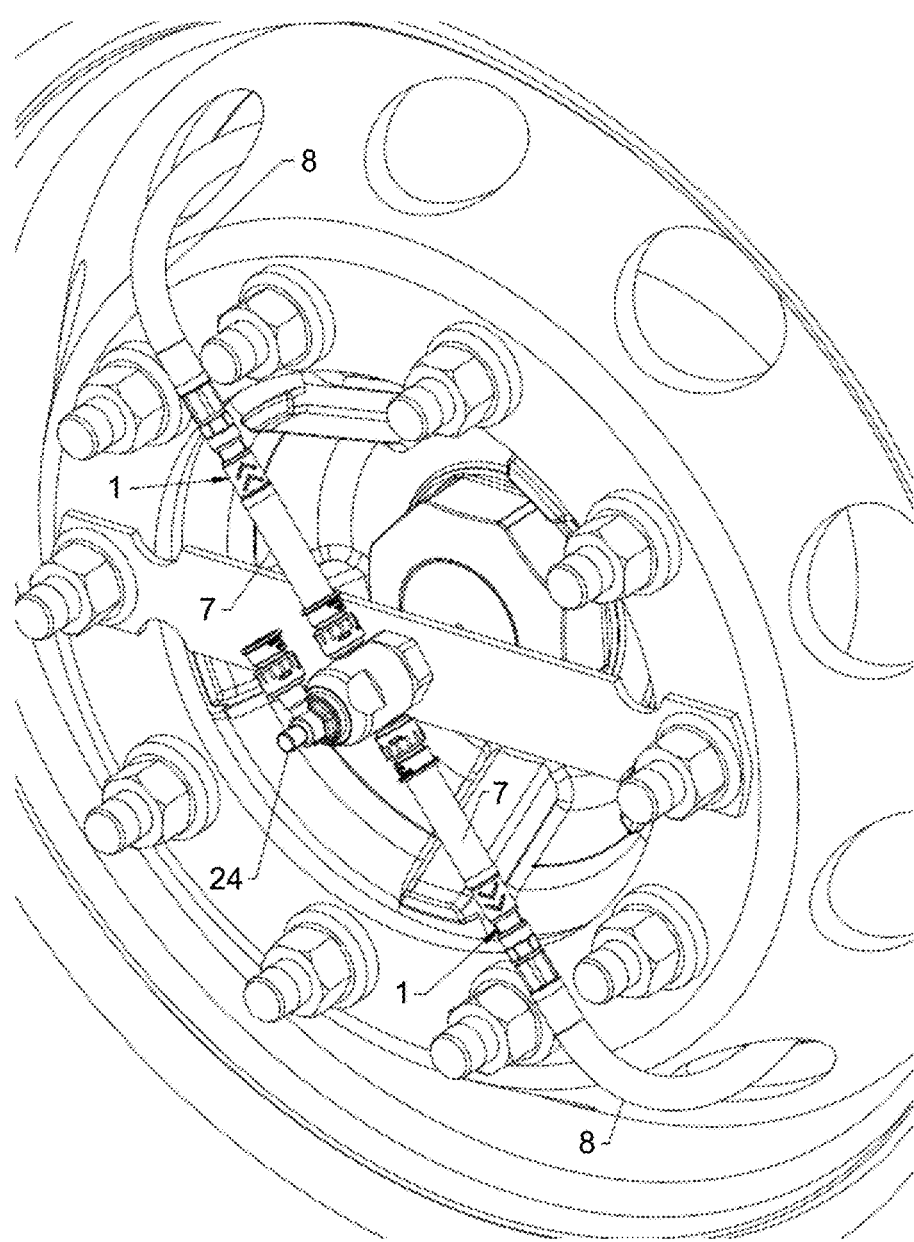
FIG. 1 is a perspective view of the viewing device of this invention being mounted on a self-inflating arrangement.

By making reference now to the figures, it may be seen that the invention is a new device that enables to view the proper operation of inflating arrangements, more particularly whether air is properly circulating while, in turn, it also enables to determine which of all of the tires is being inflated. Although reference is made in this description to the fact that the device of the invention is used in self-inflating arrangements, it is to be understood that by "inflating arrangements" it is meant any type of arrangement that enables the inflation of a tire or the like, whether they are either known self-inflating arrangements of truck trailers, buses, etc., or the conventional inflating arrangements used for inflating tires of vehicles, bikes, motorbikes, etc. at service stations or "tire workshops".

Accordingly and according to FIGS. 1 to 4, the inflation viewing device of US Published Patent Application No. 2019/0299726, from which this application claims priority, is shown by the general reference number 1 and comprises at least one main body 2 that may be externally provided with at least one translucent viewing portion 3 and internally provided with at least one one-way air path set 4. Preferably, in this invention, but without limitation, the main body 2 is translucent along its whole length whereby the viewing portion 3 is viewable by the user. Furthermore, said main body 2 has an end connected to at least an air entrance connector 5 and an opposite end connected to an air exit connector 6. Said air entrance connector 5 is operatively connected to an external air source through respective conduits 7 (not shown), a rotor 24, and the like, which are well known in the art of self-inflating arrangements and, consequently, no details shall be provided about the operation thereof. Likewise, said air exit connector 6 is connected to a tire inflation valve (not shown) through respective conduits 8.

Furthermore, internally between said main body 2 and the air entrance connector 5 a guide spacer 9 is provided which, together with respective sealing rings 10, holds the main body held between connectors 5 and 6. The guide spacer 9 has an inner passage 11, which has a wider section 12 in communication with an inner passage 13 of the main body 2 and a reduced section that defines an opening 14 that communicates with the air entrance connector 5. It is to be noted that the inner passage 13 of the main body 2 has a guide section 15 and a reduced section extending to a seat 16 that is communicated with the air exit connector 6, and the one-way air path set 4 is located therein.

Figure 2:
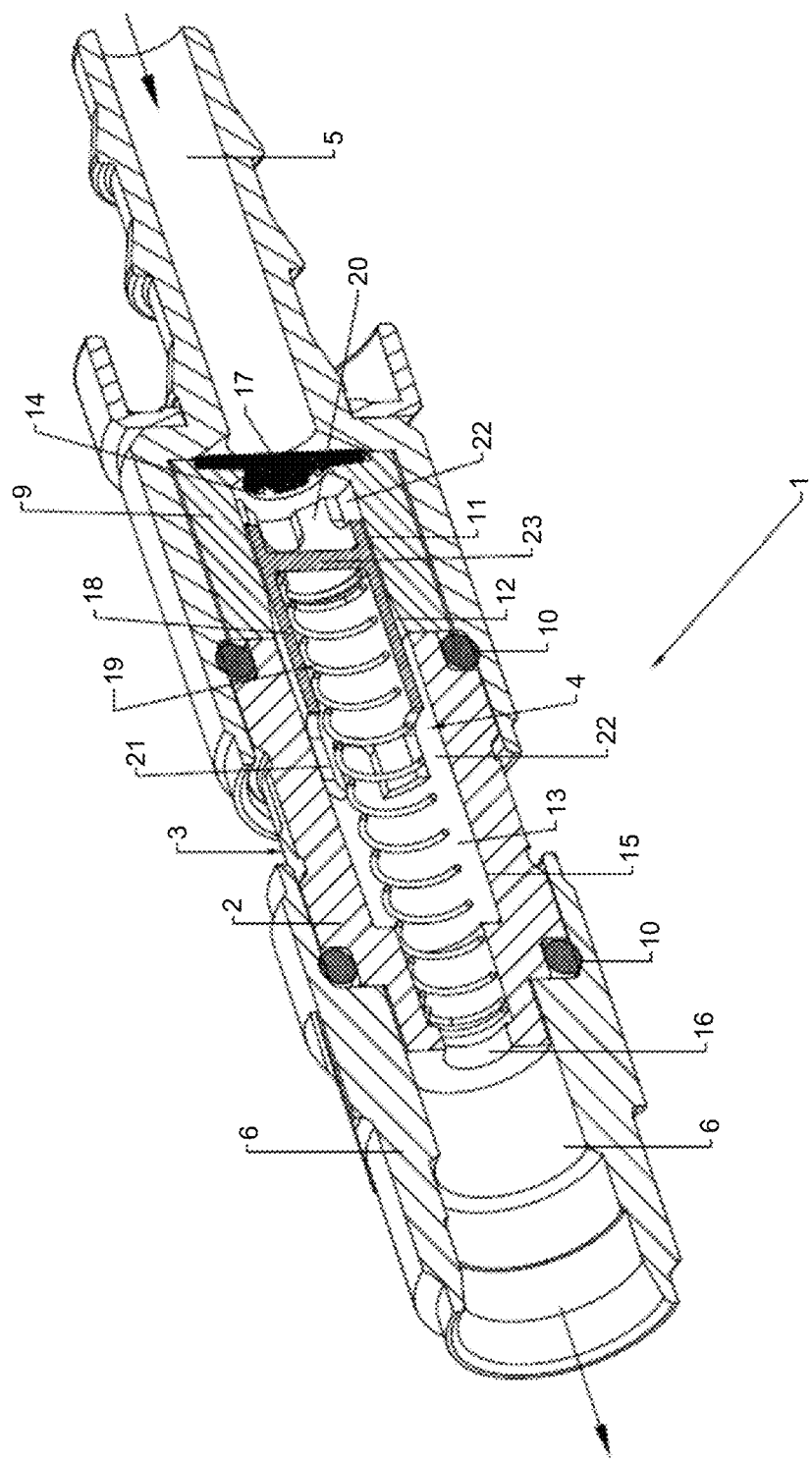
FIG. 2 is a perspective and section view of the viewing device of this invention.

With regard to the one-way air path set 4 of this invention, it consists of at least one filter 17 arranged in the communication opening 14 of the inner passage 11 of the guide spacer 9, at least a plunger 18 that is slidably guided through the inner passage 11 of the guide spacer 9 and the guide section 15 of the inner passage 13 of the main body 2, and at least a spring 19 being held between the plunger 18 and said seat 16 of the main body 2. As illustrated in FIG. 2, the plunger 18 comprises on the ends respective expansible fingers 20 and 21 which are separated between each other in such a way that they define air circulation channels or pathways 22. Likewise, the plunger 18 has a blind wall 23 which prevents the involuntary air circulation from passing through the tire inflation valve.

Figure 3:
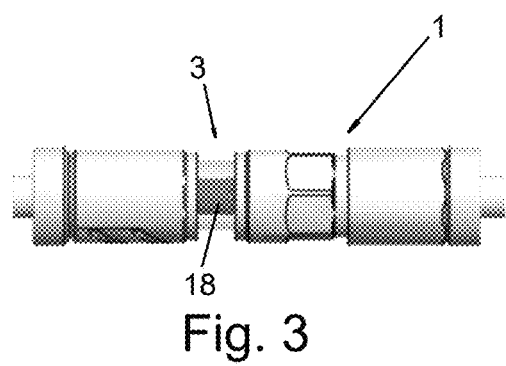
FIG. 3 is an exemplary schematic view of an operation position of the viewing device of this invention, wherein the air circulation occurs.
Figure 4:
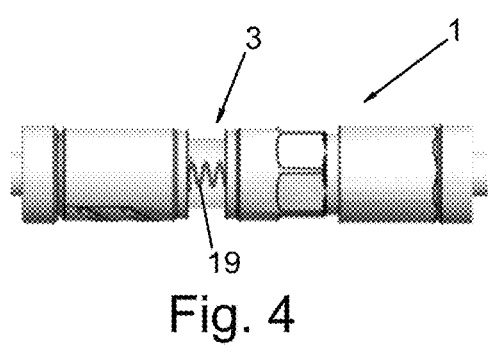
FIG. 4 is an exemplary schematic view of another operation position of the viewing device of this invention, wherein there is no air circulation.

With regard to FIGS. 3 and 4, said viewing portion 3 is made of a translucent or transparent material selected from the group consisting of acrylic, glass, or a combination thereof. The use of a translucent "glazed" portion enables the inner view of the device of the invention and it is to be noted that said translucent glazed portion is resistant to hydrocarbons. Upon activation of the self-inflating arrangement, the air coming from the external compressed air source provides enough force to weaken the spring 19 thus moving the plunger 18. This movement makes it possible to view the plunger 18 through the translucent viewing portion 3, as illustrated in FIG. 3, whereby it may be determined that air is entering through the pipe to the tire.

The movement of the plunger 18 is performed by expansible fingers 20 and 21 that are slidably guided through the inner passage 11 of the guide spacer 9 and of the section guide 15 of the main body 2. In turn, the movement of the plunger 18 is limited by the expansible fingers 21 that stop against the reduced section of the inner passage 13 of the main body 2, thus keeping the plunger in a guided way so that there are no alterations in its operative position. Upon movement of the plunger 18 which is viewed through the translucent viewing portion 3, the compressed air passes through the air circulation channels or pathways 22 defined between the expansible fingers 20, circulates through the space defined between the inner wall of the inner passage of the main body and the external wall of the plunger, passes through the air circulation channels or pathways 22 defined between the expansible fingers 21 and continue its path through the exit connector 6 towards the respective inflation valves in order to carry out the tire inflation. If no air circulates or if there is not enough air to weaken the spring strength and cause the plunger movement, only the spring 19 will be seen through the viewing portion 3 as illustrated in FIG. 4.

As stated hereinabove, although the inflation viewing device of FIGS. 1 to 4 has proved to have excellent results when used, some inconveniences have been found when a vehicle needs to have a specific checking of its tire pressure. It has happened that an operator of a tire workshop, in order to have access to the tire inflation valve, has disconnected conduit 7 of rotor 24, (see FIG. 1) and, without removing the inflation viewing device 1, the operator has inserted a pressure gauge tool or instrument through conduit 7 thus causing damage in the inner components of the inflation viewing device 1, particularly in filter 17.

Figure 5:
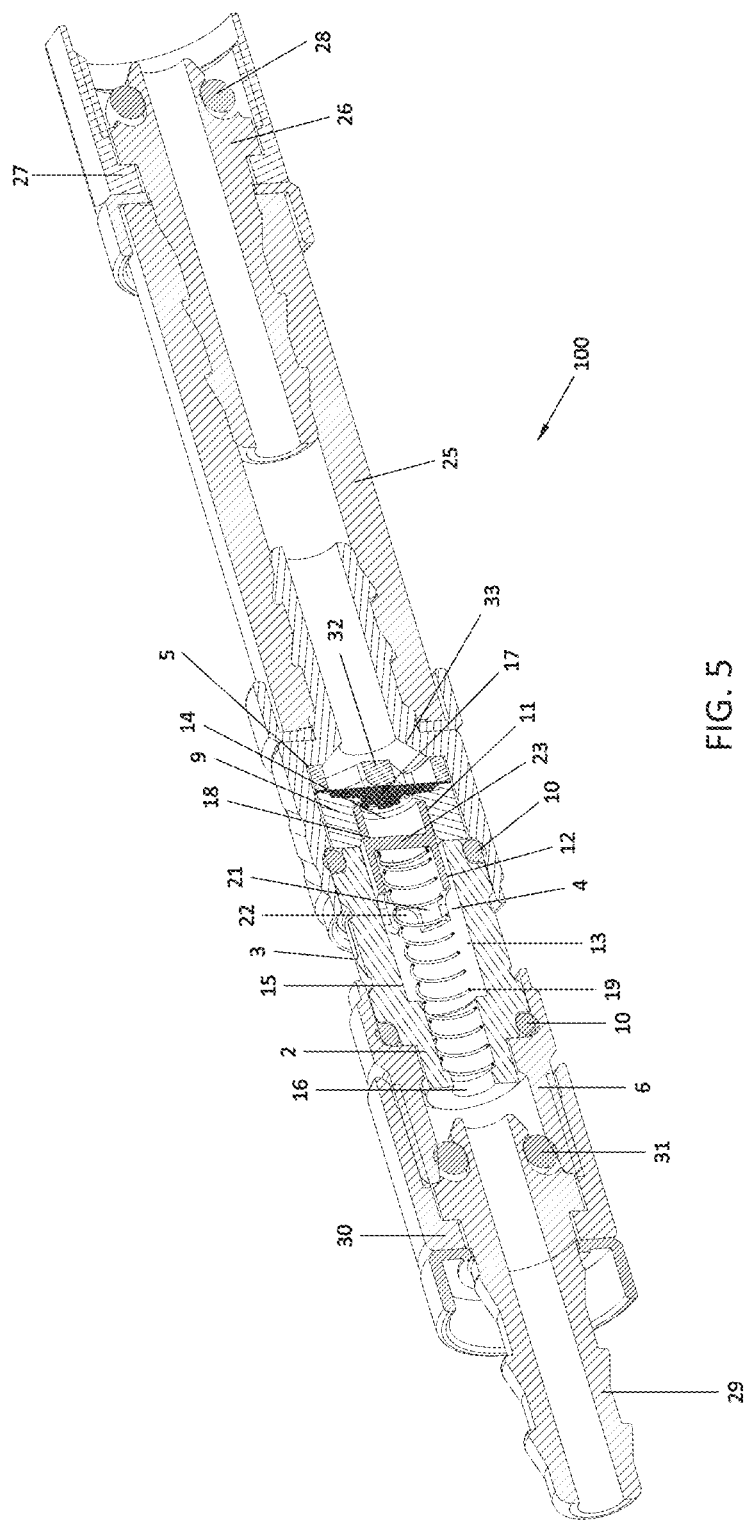
FIG. 5 is a perspective and section view of the viewing device in accordance with a second embodiment of this invention.

In order to prevent these situations, the improved inflation viewing device, generally indicated as 100, constructed in accordance with a second embodiment of this invention, is illustrated in FIG. 5. Like numerals are indicated to indicate like structure In the device of inflation viewing device 100, the air entrance connector 5 is connected to a conduit 25, preferably a flexible conduit, such as a hose, connected to an end connector 26 which shall be connected in turn to the rotor 24 by a rotary connection terminal with O-ring seals 28. This connection arrangement helps any operator in a vehicle repair shop or tire workshop to unify the assembly and efficiently check the device installation.

On the opposite end, or air exit end, of inflation viewing device 100 a terminal connector 29 is included. The terminal connector 29 is connected to the air exit connector 6 by a rotary connection 30 utilizing an O-ring seal 31. This construction enables a single operator in an Authorized Service to unscrew the viewing device 100 to check the tire pressure.

While the above-described entrance and exit end connectors 26,29 are added, the length of the main body 2, the length of the guide spacer 9 and the length of the plunger 18 are reduced as well as the corresponding connectors. This feature improves the application and allows for the unification of the viewing device for all of the vehicle tires. The length and strength of the spring 19 are also reduced thereby improving the checkings to have better stability and sensitivity of the mechanisms.

All of these modifications with regard to the embodiment of inflation viewing device 100 make it possible to prevent inflation viewing device 100 from being handled by non-specialized personnel and even if non-specialized personnel manage to disassemble the device connection, a star-shaped protecting piece 32 is provided attached within the wider diameter section of the air entrance connector 5, against an inner step 33 of connector 5, so that the filter 17 remains held between piece 32 and the guide separator 9. The piece 32 protects the filter 17 in case an inexperienced person intends to introduce an instrument through the air entrance end in order to check the pressure without removing the viewing device. The inserted instrument shall not damage the filter or any other component of the mechanism.

In this embodiment, the plunger 18 is provided with axially extended fingers 21 in only a first plunger end; that is to say, in the end facing the exit connector 6. The fingers 21 are separated between each other so that they define air circulation spaces or channels 22. In this embodiment of FIG. 5, the fingers 20 of inflation viewing device 1 are no longer necessary since enough space is provided between the plunger 18 and the guide separator 9.

It is in this way that the inflation viewing device of this invention is constituted and built, which not only enables a user to see whether the air circulation is proper but also enables a user to determine within the circuits comprised in a tire calibrator which of all of the tires is being inflated and has a leak. The invention is not limited to self-inflating arrangements since it may be considered, adapted and used in conventional inflating arrangements or in air pressurization networks. Furthermore, although the device of the invention has been illustrated as being arranged between a connection conduit to the rotor (which may be either internal or external) and the connection conduit to the inflation valve, it does not imply that the invention is limited to said arrangement, but, instead, it may also be provided in any type of connection of an air pressurized network or in any type of conventional inflation arrangement. It is also to be noted that the translucent viewing portion is resistant to hydrocarbons.

The invention claimed is:

1. An inflation viewing device comprising:
   at least a main body which is externally provided with al least one transparent viewing portion and internally provided with an inner passage wherein an at least one-way air path assembly is arranged,
   at least one air entrance connector being operatively connected to an external air source and to a first end of said main body,
   an air exit connector being connected to a second, opposed end of the main body and to at least one inflation valve,
   a guide spacer provided between said air entrance connector and the main body, said guide spacer having an inner passage which has a wider section that is in communication with the inner passage of the main body and a reduced section that defines a communication opening with the air entrance connector,
   at least one filter disposed in said communication opening,
   at least one slidably guided plunger slidably disposed within the inner passage of the guide spacer and guide section of the inner passage of the main body,
   at least one spring, biasing the plunger being disposed between the plunger and a seat of the main body,
   axially extending fingers at a first end of said plunger, which fingers are separated from each other, defining air circulation channels, and
   a protecting piece mounted against an inner step of the air entrance connector whereby the filter is retained between the protecting piece and the guide spacer.

2. The viewing device according to claim 1, wherein said viewing portion is made of a transparent material selected from the group consisting of acrylic, glass or a combination thereof.

3. The viewing device according to claim 1, wherein the air entrance connector is connected to an end connector which in turn is connected to a rotary connection.

4. The viewing device according to claim 1, wherein the air exit connector is connected to a terminal connector which in turn is connected to a rotary connection.

* * * * *